United States Patent [19]

Mathes

[11] 3,967,066

[45] June 29, 1976

[54] SECRET TELEPHONY

[75] Inventor: Robert C. Mathes, Maplewood, N.J.

[73] Assignee: Bell Telephone Laboratories, Incorporated, Murray Hill, N.J.

[22] Filed: Sept. 24, 1941

[21] Appl. No.: 412,054

[52] U.S. Cl. .............................................. 179/1.5 R

[51] Int. Cl.² .......................................... H04K 1/02

[58] Field of Search ..................... 179/1, 1.5, 1.5 R; 178/22

[56] References Cited

UNITED STATES PATENTS

| | | | |
|---|---|---|---|
| 1,542,566 | 6/1925 | Mathes | 179/1.5 |
| 1,829,783 | 11/1931 | Chestnut et al. | 179/1.5 |
| 2,098,956 | 11/1937 | Dudley | 179/1.5 |
| 2,107,756 | 2/1938 | Kendall et al. | 179/1.5 |

*Primary Examiner*—Howard A. Birmiel
*Attorney, Agent, or Firm*—H. A. Burgess

EXEMPLARY CLAIMS

1. In a system of secret transmission of speech, means to subdivide speech waves constituting a message into a plurality of narrow frequency bands, means to integrate the energy in each band, means including a key for determining in successive time intervals a succession of indications unrelated to the speech being transmitted, and transmitting means controlled jointly by the integrated energy from each band and by said indications for transmitting a cipher from which to derive said speech message.

10. In a speech privacy system, means to analyze speech message waves into a plurality of low frequency waves simultaneously existent in a corresponding plurality of separate channels, and enciphering means for adding to each such low frequency wave a varying key wave of similar amplitude and frequency range to destroy the identity of the low frequency waves before transmission.

34 Claims, 10 Drawing Figures

INVENTOR
R.C. MATHES
BY H. A. Burgess
ATTORNEY

INVENTOR
R. C. MATHES
BY H. A. Burgess
ATTORNEY

INVENTOR
R. C. MATHES
BY
H. A. Burgess
ATTORNEY

INVENTOR
R. C. MATHES
BY

ATTORNEY

SECRET TELEPHONY

The present invention relates to transmission and reception of speech or similar signals with a high degree of secrecy.

Some degree of privacy in speech communication is readily obtainable by use of any one of many types of distortion at the transmitter with cooperating means to remove the distortion at the receiver. For example, some conditions are satisfied if the message cannot be decoded within a half hour or so. Privacy to this degree can be obtained in, for example, portable systems.

If, on the other hand, it is important that the message remain secret for a long period of time such as several months, this places a very much greater requirement on whatever type of masking or scrambling is used. It is possible for a listener to make a record of the message during transmission and then study the record at lesiure, applying to such study all the known techniques involving filtering, heterodyning, making oscillograms, etc. Such study may reveal points of division of the message as to frequency, amplitude or time, which permits study of the component parts separately. Inversion of the frequency, shift of frequency, relative delay, etc. - all of these may be tried in various combinations on each portion of the message. Experience shows that it is probably impossible by known methods to defeat the unscrambling of speech waves, given a sufficient time in which to study the scrambled speech, provided the scrambling is of a type which permits a feasible degree of unscrambling by known apparatus at the receiver to enable ordinary telephone conversation to be carried out.

Substantially complete secrecy is obtainable in telegraph transmission by the method disclosed in Vernam Pat. 1,310,719, July 22, 1919. This method uses a continuously changing code or key made up of telegraph characters which may represent letters formed into words unrelated to the message or merely disconnected letters or numbers. Each one of these characters of the key is combine with a character of the message and the resultant of such combination is sent. At the receiver an identical key is used and is, as it were, subtracted from the received message so that the difference gives the original message. Each transmitted character gives no clue to either the code or the message, for the letter A of the message may at one occurrence in the message be transmitted as any one of the twenty-six letters of the alphabet or as a number or other symbol and at its next occurrence it may likewise be transmitted as any one of the twenty-six letters or other symbol.

The Vernam method as applied to telegraphy meets the important requirement of a really private system, namely, that the apparatus and method of transmission need not be secret by may be known to third parties. So long as the key in use at the moment is known only to the communicating parties, the message cannot be successfully received by others.

This method which has proved so successful in the case of telegraphy does not appear feasible for direct application to ordinary telephony because of the great complexity of the essential factors involved in speech transmission. In telegraphy it is only necessary to reproduce at the receiver spacing and marking signals in a particular time order. In telephony, on the other hand, it is necessary to reproduce at the receiver a varying amplitude wave the frequency components of which must be preserved with fair accuracy throughout a range of several hundred cycles at least, with sufficient amplitude margin over noise or other extraneous sounds. This fact would make it very difficult to add to the speech before transmission a distortion so complete as to destroy the intelligibility while at the same time enabling the necessary restoration of the wave form at the receiver to permit the speech to be understood.

The present invention achieves a very high degree of secrecy in telephony by applying the predistortion not to the speech waves directly but to low frequency waves obtained by analysis of the speech prior to transmission. These low frequency speech-defining waves are currents or voltages with slowly varying amplitudes, and they afford the possibility of being operated upon separately and individually each in accordance with a separate code or key. Transmission of these with a high degree of privacy is possible, after which they may be recovered by use of duplicate keys. The speech is reproduced from the restored speech-defining currents in known manner.

The nature and objects of the invention will be more fully understood from the following detailed description in connection with the accompanying drawings.

In the drawing FIGS. 1, 2 and 3 show graphs to be referred to in the description of the principle of operation of the invention;

FIGS. 4 and 5 when placed together with FIG. 4 at the left show in schematic diagram a complete one-way transmission system in accordance with the invention, the transmitting station being shown in FIG. 4 and the receiving station in FIG. 5;

Reference was made above to low frequency speech-defining waves which in accordance with the invention are operated upon separately and individually to render the transmission secret. These speech-defining waves are in the present disclosure obtained by analysis of speech waves in a manner disclosed in H. W. Dudley Pat. 2,151,091, Mar. 21, 1939, or in R. R. Riesz Pat. 2,183,248, Dec. 12, 1939. The appearance of these speech-defining waves may be seen from oscillograms included in a paper by Dudley entitled "The Carrier Nature of Speech" published in the Bell System Technical Journal for October 1940, Vol. 19, pgs. 495 to 515, the oscillograms being given in FIG. 10 on page 512.

Figure 1:
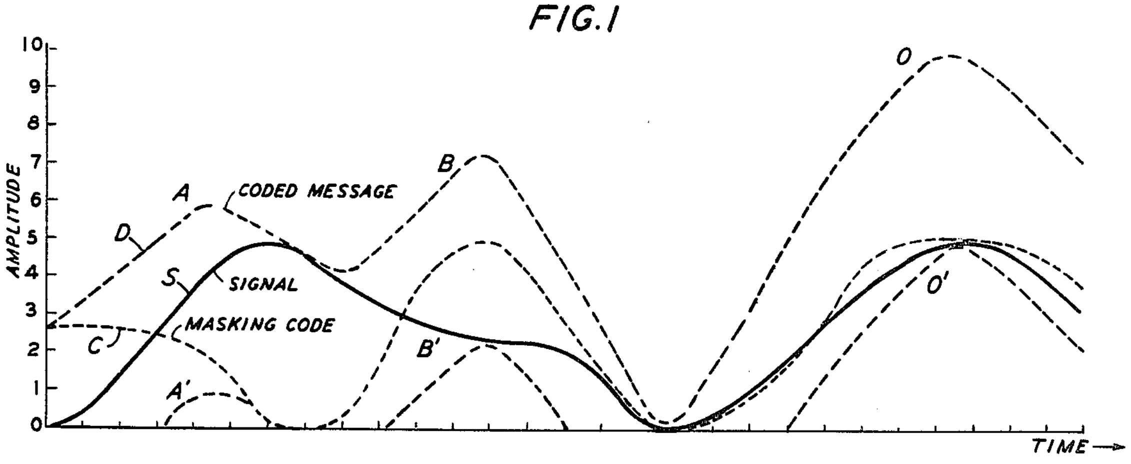

Referring to FIG. 1 of the present application, the wave marked S has been arbitrarily drawn to represent one of these speech-defining waves with the horizontal or time scale shortened in order to get more of the amplitude variations on the sheet. It will be understood from the patents and publication referred to that a given speech wave may be analyzed into a number of such speech-defining waves simultaneously existing in separate circuits and that conversely understandable speech may be synthesized from these speech-defining waves in the manner disclosed in the Dudley and Riesz patents. Without intending in any wise to limit the number of such speech-defining waves to be used it will be assumed as a matter of convenience that the speech is analyzed into 11 low frequency waves, a pitch-defining current and 10 low frequency speech-defining waves, and that the signal wave represented in FIG. 1 is some one of the ten speech-defining waves. The other nine speech-defining waves will differ more or less in actual wave form from this one and also from each other but it may be assumed that they all have the same fundamental characteristics, that they may be transmitted in a 0–25-cycle frequency range and that their extreme amplitude variations are of the same order of magnitude or may be made so by use of suitable equalizers. While the frequency range is given as 0–25 cycles most of the energy is apparently carried by components of no higher frequency than about 10 cycles.

The invention proposes to reduce or destroy the intelligence carried by these signal-defining waves before transmission and to compensate at a receiving point for such reduction or destruction of intelligence in these waves. While in its broadest aspects the invention contemplates operating upon these speech-defining waves to render transmission secret, the method for accomplishing this object to be specifically disclosed herein comprises the addition of a masking code or key to these speech-defining waves at the transmitter and a subtraction of the masking code or key at the receiver.

Such a masking code is illustrated at C in FIG. 1. It is assumed to have similar amplitude and frequency characteristics to the speech-defining signal wave but to be completely unrelated to the signal. For example, in this figure it may comprise a signal-defining wave obtained by similar analysis of speech waves or similar sound waves unrelated to the message to be transmitted.

The result of the direct addition of the signal wave S and masking wave C is shown by the coded message wave D in dashed line in FIG. 1. Assuming a maximum amplitude of 5 units for the signal and also for the masking code, it is seen that the coded message wave has a total amplitude wave of 10 units since the maximum amplitude of the signal will from time to time fortuitously occur at the same instant as the maximum amplitude of the masking code. Such a simple combination of the signal and masking code would not give maximum secrecy of transmission for when the transmitted combined wave has the value zero it is known that the signal is zero and when the transmitted combination wave has an amplitude of 10, it is known that the original signal amplitude must have been 5. The waves have purposely been drawn in FIG. 1 to show these two cases. A system having a maximum degree of secrecy will not permit this much information about the signal to be ascertained merely from study of the transmitted waves.

A greater degree of ambiguity may be secured if the amplitude values which are transmitted are restricted to the amplitude range of 0–5 units by the procedure of subtracting 5 units from those parts of the signal which exceed the amplitude 5 before transmission. Such a subtraction is indicated in FIG. 1 at A′, B′ and O′ which represent peaks A, B and O extending above the 5-unit line shifted downward by 5 units. The term "reentrant masking" may be conveniently applied to this type of coding since the peaks of the waves which extend above the 5-unit level "reenter" the 0–5 amplitude range from below. This process may be gone through a greater number of times than twice by confining the transmitted amplitudes to a smaller range, such for exaple as 0–2.5 units. (The reentrant principle may be illustrated by the rotation of a point around a circle, the point passing through angular position 30° in successive rotations at 30°, 390°, 750°, etc., or by the minute hand of a clock which goes through the same angular position from hour to hour.)

Figure 2:
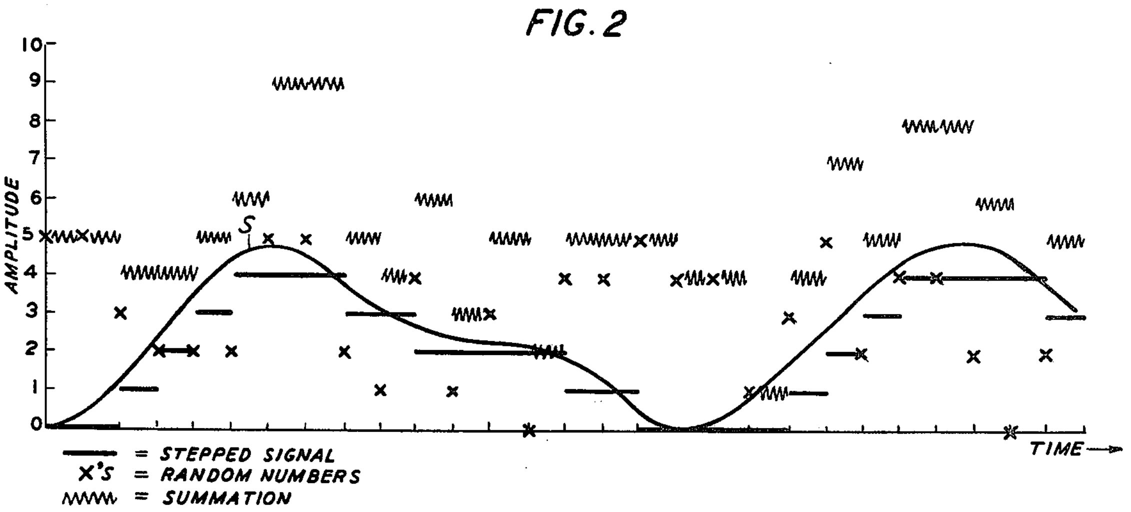

Reentrant masking reduces the power load on the transmitter but will require a wider frequency band in its transmission due to the sudden transition in amplitudes which must be kept track of in the sudden shift from one boundary to the other. When such a signal is listened to by the synthesizing part of the system of the Dudley or Riesz patent referred to, the effective masking produced by this reentrant arrangement should be greater than that produced by simple superposition. However, if those who are attempting to break the system should make an oscillographic record of the received signals, it should not be too difficult to reconstruct the superposition form of coded message from the reentrant form. Hence it is desirable to provide some means for carrying out this procedure which will be free from this objection. Such a procedure is indicated in FIG. 2. The same signal curve S is shown here which was used in FIG. 1. It will be assumed that a mechanism is available for telegraphizing this uniform signal into a series of discrete amplitudes. The rule which will be followed for this mechanism is that during any time interval in which the amplitude of the signal S at the beginning of that time interval is less than 1 unit the output amplitude will be zero. If it lies between amplitudes 1 and 2, the output amplitude will be 1; if between 2 and 3 the output amplitude will be 2, etc. By this process the series of discrete amplitudes will be derived which are shown by horizontal straight lines in FIG. 2. The masking code which will be employed will no longer be of the same functional characteristic as the signal S or the masking code C shown in FIG. 1 but will be a series of random numbers ranging between 0 and 5 in value with equal likelihood of occurrence. These arbitrary code values are indicated by the small $x$'s which are drawn in at the beginning of each time unit. The sum of the discrete values derived from the original signal and these $x$ values is indicated by the wriggly horizontal lines.

This simple superposition of random numbers upon the original signal values will not lead to a particularly high degree of masking as it can readily be seen that an average curve drawn through the wriggly lines will retain many of the characteristics of the original signal curve S. The higher the frequency at which the telegraphizing is done the easier it will be to filter out the effect of the random code while at the same time there is a lower limit set by the degree of approximation which the stepped signal must provide to the original. If, however, we apply the reentrant principle to these signals, sliding all those down 5 units which are above amplitude 5, FIG. 2 becomes transformed into FIG. 3. These signals, if used as the transmitted message will have no systematic correlation with the original signal S and complete ambiguity is secured. If at the receiving end of the circuit the arbitrary code values are subtracted from the signals indicated in FIG. 3, and those units which fall below 0 have 5 added to them, the original signal may again be recovered.

Figure 3:
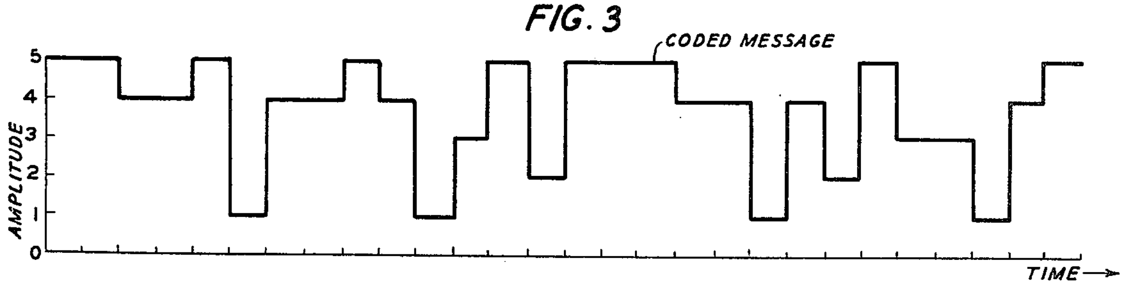
Figure 4:
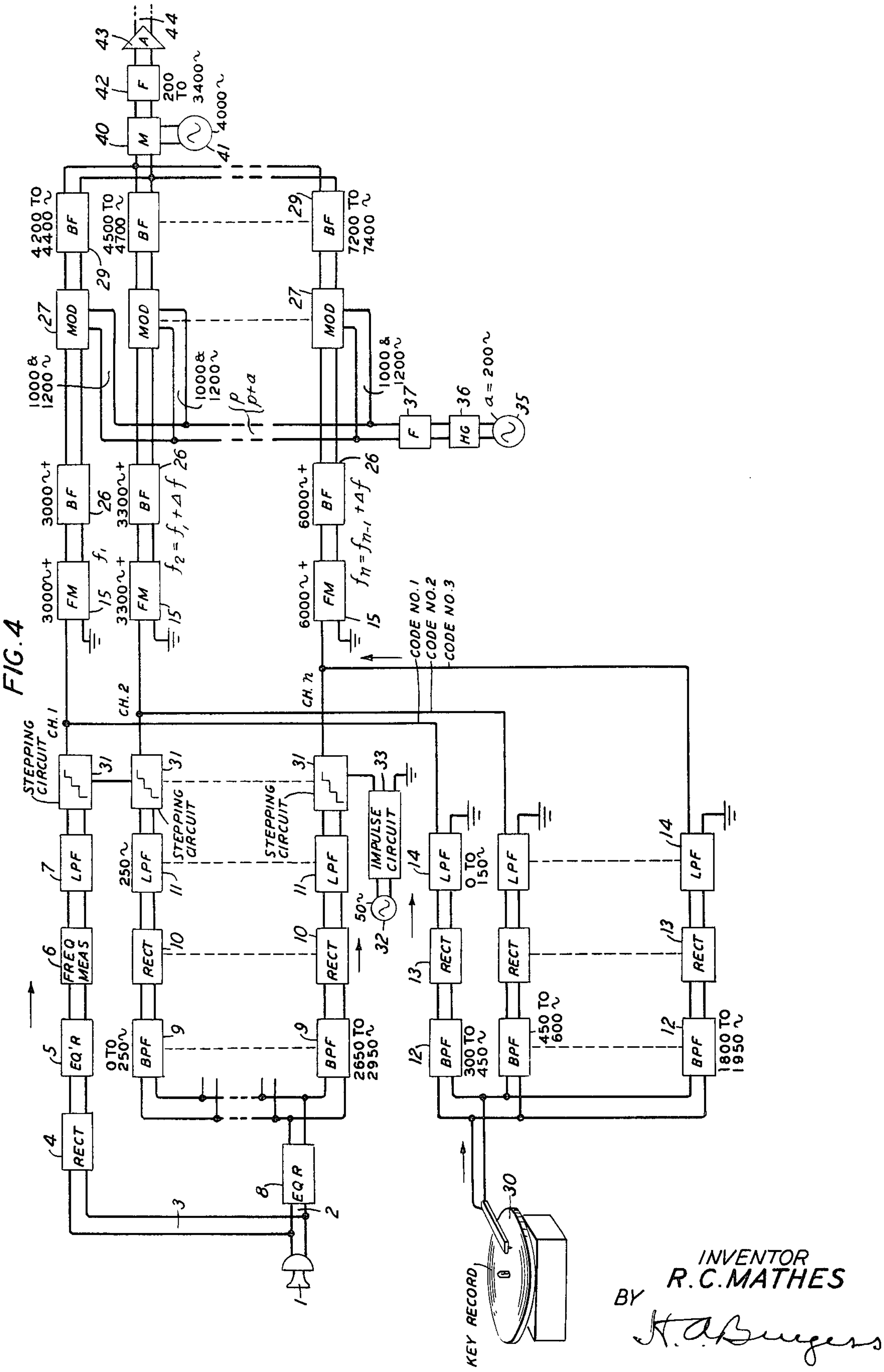
Figure 5:
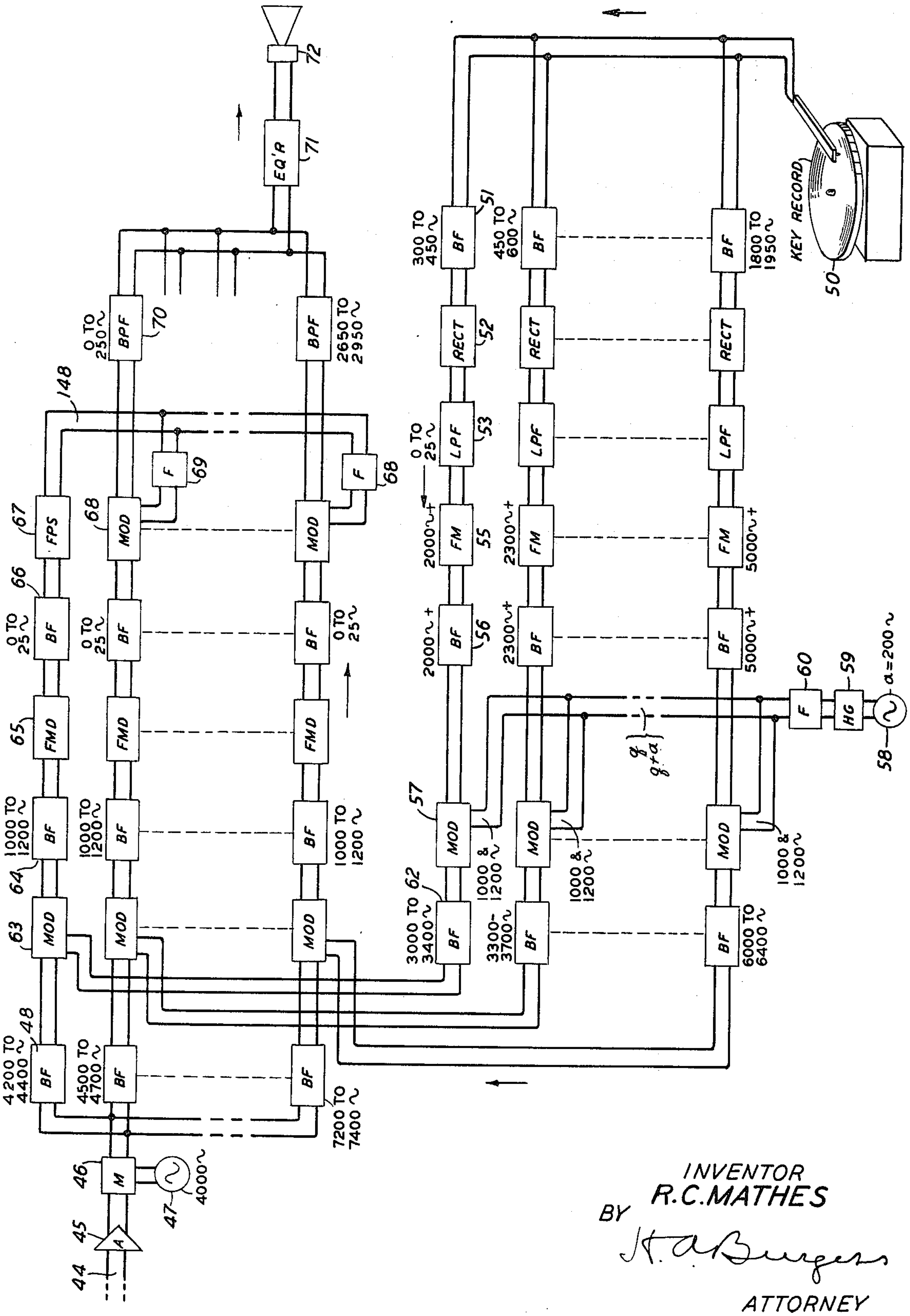

REference will now be made to FIGS. 4 and 5 representing a circuit for carrying out the tranformation described in connection with FIGS. 1 to 3. In FIG. 4 the speech that is to be transmitted is spoken into transmitter 1 and the masking code is assumed to be recorded on any suitable type sound record, here represented as disc 30, although it would be obvious to use a telegraphone tape, photographic film, or other record.

The speech waves spoken into transmitter 1 are in part transmitted through circuit branch 3 to a rectifier 4, equalizer 5, frequency measuring circuit 6 and low-pass filter 7, all of which may be the same pieces of apparatus as are disclosed at the corresponding point in FIG. 1 of the Riesz patent cited above. These circuit elements give a low frequency wave in the output of filter 7, the shape of which is indicated for certain specified sounds by the oscillogram of the pitch-defining current in FIG. 10 of the Dudley publication referred to. This wave is of the same general shape as are the speech-defining waves discussed above.

The speech waves from microphone 1 also pass through the equalizer 8 to the band-pass filters 9 of which there may be, for example, 10. These filters subdivide the speech wave frequency band into 10 component subbands, the band widths of which may be the same, for example, as in the Riesz patent although the band widths chosen are not critical. Each filter 9 is followed by rectifier 10 and low-pass filter 11. The action of these circuit elements is to give in each of the 10 channels a speech-defining wave of the character shown in the oscillograms in the Dudley paper and discussed above. In general, the amplitude of the speech-defining waves derived from the higher frequency regions of speech are smaller than those of the waves derived from lower frequency portions of the speech band and the equalizer 8 may be used to equalize the amplitudes of all of the speech currents or voltages.

It is assumed that 11 masking codes are recorded on the record 30. For example, each code occupying a band width of 0–150 cycles may be superposed on an individual carrier and all of the code modulated carriers may be recorded at once, analogous to the transmission of multiplex carrier waves over the same transmission line. The carrier wave frequencies used are, for example, 300 cycles, 450 cycles, 600 cycles and so on up to 1800 cycles. If the upper side-band alone is recorded, the bands will occupy the frequency postitions 300–450 cycles, 450–600 cycles and so on up to 1800–1950 cycles. The masking code signals themselves may be derived by any procedure that will give random numbers, for example by drawing numbers by lot, throwing dice, etc. and recording in each interval indicated in FIG. 2 a carrier wave whose amplitude has a value corresponding to the number that is obtained by chance. This procedure is followed for each code channel.

The side-bands recorded on the record 30 are reproduced by an electrical pick-up and the reproduced waves are separated by band-pass filters 12, each of which is followed by a rectifier 13 and low-pass filter 14 having a pass range of 0–150 cycles. This band is wide enough to permit the abrupt amplitude shifts indicated in FIGS. 2 and 3 to take place at a rate of 50 per second, for example.

In order to convert the slowly varying speech-defining waves into abruptly stepped waves as described in connection with FIGS. 2 and 3, a stepping circuit 31 is inserted after filter 7 or 11 in each of the analyzer channels. The nature of this circuit will be described more fully at a later point in connection with FIG. 6. The stepping circuits 31 are supplied with impulses from an impulse circuit 33 fed from a sine wave generator 32 which may generate a frequency of, for example, 50 cycles. With this frequency the stepping circuit is capable of stepping the voltage to a different value at the rate of 50 times a second.

Figure 7:
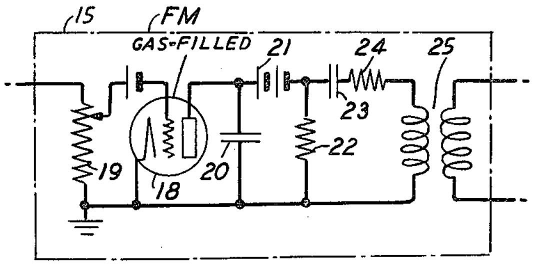
FIG. 7 is a circuit diagram of a frequency modulator forming a component part of the system.

The masking code signals are combined with the speech-defining waves obtained from the output of the microphone 1 in a series of channels 1 to 11 leading to individual frequency modulator circuits 15. These frequency modulators, the details of which will be described later in connection with FIG. 7, give an output wave the frequency of which varies directly with the amplitude of the input voltage, starting with a preassigned lower limiting frequency corresponding to zero input voltage. For example, the modulator 15 for channel 1 generates 3000 cycles when the input voltage is zero. The frequency is varied from 3000 to 3200 cycles by the signal alone changing from zero to its maximum amplitude and is varied to the same extent by the masking code alone in varying from zero to its maximum amplitude. When both the signal and the masking code are applied, therefore, the total variation may be from 3000 to 3400 cycles. The frequency modulators of channels 2 to 11 are normally set to generate waves differing in frequency by 300 cycles, from 3300 cycles for channel 2 up to 6000 cycles for the eleventh channel. Band filters 26 which may not be necessary or which may in some cases be low-pass filters for suppressing harmonics from the frequency modulators are designed to pass a 400-cycle band extending upwards from the normal frequency at which the particular modulator is set for zero input. The outputs of various frequency modulators 15 are impressed on the amplitude modulators 27 along with two frequencies, in this case assumed to be 1000 cycles and 1200 cycles, respectively, obtained from a suitable source 35, such as a 200-cycle oscillator connected to a harmonic generator 36 and filter 37.

The band filters 29 following the amplitude modulators 27 select a portion of the upper side-band including in the case of channel 1 the range 4200 cycles to 4400 cycles and a corresponding 200-cycle band in the case of each of the other channels.

The purpose of the frequency modulating stage, the amplitude modulating stage and the band filters 29 is to give the reentrant action described in connection with FIGS. 2 and 3. The manner in which this is done may be seen from considering FIG. 10, for example. The pass-band of the filters 29 is indicated at 75 of frequency width *a* where *a* is the extent of maximum frequency swing produced in modulator 15 by the signal alone or alternatively by the masking code alone. Taking the values assumed for illustration in the case of channel 1, the pass-band is 200 cycles as stated. The upper side-band in the output of modulator 27, channel 1, is seen to have an extreme range from 4000 cycles. When there is zero input to the frequency modulator 15 there is an addition of the 3000-cycle frequency from the frequency modulator to the two frequencies 1000 cycles and 1200 cycles applied from the filter 37 giving output frequencies of 4000 and 4200 cycles, respectively. With the maximum frequency of 3400 cycles from frequency modulator 15 the corresponding output frequencies from modulator 27 are 4400 cycles and 4600 cycles, respectively.

For each frequency produced by frequency modulator 15 there are, therefore, two frequencies in the output of modulator 27 due to the use of the two modulating frequencies 1000 and 1200 and it will be observed that only one of the resulting two frequencies falls within the pass range of the filter 29. For example, let it be supposed that the frequency modulator, channel 1, is at any instant putting out a frequency of 3100 cycles. The output of modulator 27 then comprises 4100 cycles and 4300 cycles, only the latter of which will be transmitted through transmitter 29. If the output of the frequency modulator is 3300 cycles the output of modulator 27 comprises 4300 cycles and 4500 cycles, only the former of which is transmitted through filter 29.

Referring to FIG. 1 and assuming in this case that the wave S represents the pitch-defining current in the uppermost channel of FIG. 4, it will be seen that whenever the summation curve A rises above 5 units in value the output of frequency modulator 15 in channel 1 is arranged to exceed 3200 cycles so that with a further increase in amplitude of the summation wave the output of modulator 27 is seen to comprise a freuqency that increases from 4200 cycles upwards and another freuency that increases from 4400 cycles upwards. The latter frequency is now passing out of the range of the filter 29 (see FIG. 10), while the former frequency is appearing at the lower edge of the filter and is transmitted. This corresponds to the reentrant portion A' of FIG. 1 appearing at the bottom of the diagram after being displaced downward from the peak position A.

Figure 10:
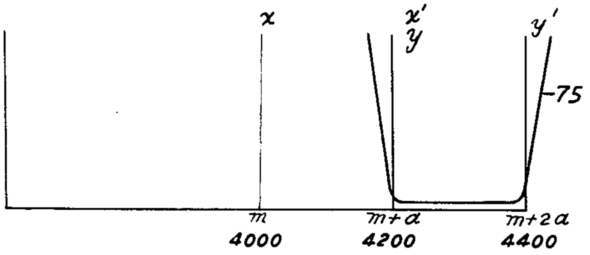
FIG. 10 shows a curve to be referred to in the description.

In similar manner the band filters 29 of the other channels each transmits a 200-cycle band taken from the central part of the upper side-band emerging from modulator 27 and acts in the manner described in connection with FIG. 10 to give reentrant coding.

The waves transmitted through the filters 29 may if desired be transmitted directly over a line to the receiving station of FIG. 5 or they may be transmitted through any other type of medium or channel such as by radio. In the present disclosure it is assumed that they are to be transmitted over an ordinary telephone line 44 at substantially speech frequencies and they are, therefore, stepped downward in the modulator 40 to the range 200 cycles to 3400 cycles, this range being the pass range of the filter 42. A wave of 4000-cycle frequency is applied to the modulator 40 from source 41. If desired, the waves may be amplified at 43 before transmission.

The waves received in the receiving circuit of FIG. 5 are amplified at 45 and are stepped upward in frequency in modulator 46 by modulating them with waves of 4000-cycle frequency from generator 47. Each of the band filters 48 is identical with the corresponding filter 29 so that the waves existing in the eleven channels at the output terminals of the filters 48 may be considered the same as the waves at the output terminals of the filters 29 of FIG. 4.

The record 50 in FIG. 5 is a duplicate of the record 30 in FIG. 4 and has recorded on it identically the same codes or key. The codes for the eleven channels are derived through the subdividing filters 51, rectifiers 52 and low-pass filters 53 corresponding to the similar elements of FIG. 4. The outputs of these filters are applied to the frequency modulators 55 which may be of the same type as the frequency modulators 15 but in this case the frequency variation or swing is only 200 cycles since only the code currents are applied to these frequency modulators. The normal frequencies produced by these frequency modulators in the absence of any applied input is taken for illustration as 2000 cycles for channel 1 and a frequency of 300 cycles higher than this for each of the other channels. The outputs of these frequency modulators are transmitted through the band filters 56 to the amplitude modulators 57 where they are combined with waves of two frequencies, a 1000-cycle wave and a 1200-cycle wave derived from 200-cycle source 58 through harmonic generator 50 and filter 60. The upper sidebands resulting in the outputs of modulators 57 are transmitted through respective band-pass filters 62 to individual modulators 63 which are also fed from respective filters 48 in the different speech-defining wave channels. The lower side-bands from the outputs of modulators 63 are transmitted through filters 64 each having a 200-cycle passband extending in this case from 1000 cycles to 1200 cycles.

The filters 64 function somewhat similarly to the filters 29 in that they select a 200-cycle band from the central part of the output side-band from the modulators 63 and give a reentrant type of action which results in removing the masking code from the signal regardless of whether the coded message as transmitted at any instant resulted from a simple addition of the signal and masking code without the reentrant action or resulted from the reentrant action.

It is thought that this can best be illustrated by a numerical example. Let it be supposed that in channel 1, FIG. 4, at a particular instant the signal alone is of such amplitude as to produce an output frequency from frequency modulator 15 of 3150 cycles and that the masking code in this instance raises the frequency 20 cycles higher to 3170 cycles. The two frequencies produced in the output of modulator 27 (upper side-band) are then 4170 cycles and 4370 cycles of which only the 4370-cycle component is transmitted through the filter 29. When this is received in modulator 63, FIG. 5, and combined with waves of 3020 cycles and 3220 cycles from filter 62 there result two frequencies 1150 cycles and 1350 cycles, of which only the 1150-cycle wave is transmitted through filter 64. It will be noted that in this process the 20-cycle frequency variation introduced by the masking code has now been removed.

Consider now that the same signal as before is impressed on the frequency modulator 15 of FIG. 4 so that the output due to the signal is 3150 cycles but that the masking wave is large enough to increase the frequency by 120 cycles giving an output frequency of 3270 cycles. This produces in the output of modulator 27 two frequencies, namely, 4270 cycles and 4470 cycles of which only the former is transmitted through the band filter 29. It will be noted that in this case although the masking wave is of higher amplitude than the first assumed case the transmitted frequency is actually lower. When the 4270-cycle wave is received in the input of modulator 63 it is, in this case, combined with waves of frequencies 3120 cycles and 3320 cycles from filter 62 giving two output components of 1150 cycles and 950 cycles, respectively, of which only the former is passed through the filter 64. It will be noted that in both cases the frequency pased through the filters 64 is 1150 cycles representing the signal from which the masking code has been separated.

In this way there is obtained in the output of each of the filters 64 a frequency varying between the limits of 1000 cycles and 1200 cycles and representing the recovered signal corresponding to the pitch-defining current and the speech-defining currents of the various analyzer channels of FIG. 4 except that these appear as frequency modulated waves. Accordingly, the frequency modulation detectors 65 are used to derive the low frequency pitch-defining and speech-defining currents occupying the 0–25-cycle range. The circuit of the frequency modulation detectors 65 may be of any suitable type, one example being given in FIG. 9 to be described presently.

The pitch-defining currents are applied to the frequency pattern source 67, which will be described later in connection with FIG. 8 but which may be of the same type as disclosed in the Dudley or Riesz patents, the purpose of this circuit being to generate electrical waves simulating vocal cord vibrations and also electrical waves simulating the effect of expelling the breath through restricted mouth cavities as in producing unvoiced sounds. These waves are used in the reconstruction of understandable speech from the speech-defining waves as in the Dudley and Riesz patent disclosures. Waves emanating from the source 67 but lying in different regions of the total speech band are passed through individual filters 69 to individual modulators 68 where they are combined with the low frequency speech-defining waves in the various channels. The lower side-band resulting from each such modulation is transmitted through corresponding band-pass filters 70 and the outputs are combined and passed through the equalizer 71 to the speech reproducer 72. Equalizer 71 may compensate for the distortion introduced by equalizer 8 of FIG. 4.

The necessary degree of synchronism between the key records at the different stations may be obtained in accordance with known practice. The requirements are much less severe than in certain previously proposed systems in which making waves or impulses are to be added directly to speech waves since in the present case the operations are made on low frequency waves. It will probably suffice to operate the key records by synchronous motors driven from independent sources such as oscillators whose frequency is controlled by temperature-compensated crystals or to drive the motors from any substantially constant frequency sources. It is also apparent that a pilot wave may be transmitted for holding the records in step with each other in accordance with known practice.

Figure 6:
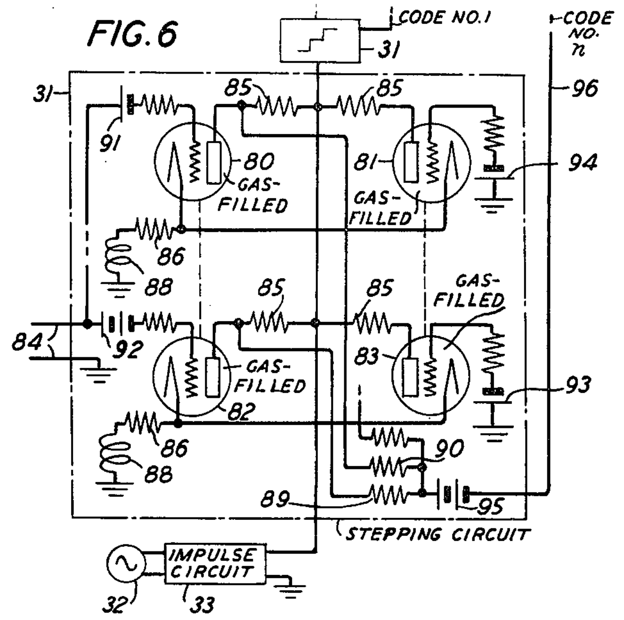
FIG. 6 is a circuit diagram of the stepping circuit employed as a component part of the system.

The stepping circuit 31 may take the form shown in FIG. 6. A plurality of pairs of gas-filled tubes 80, 81, 82, 83, etc., one pair for each voltage step to be provided for, are associated in the circuit with the impulse circuit 33 which preferably supplies square voltage waves at about 50 pulses per second separated by a short interruption interval between pulses just sufficiently long to permit the tubes that have broken down to become deionized. Only one tube of a pair can be ionized at the same time due to the employment of an interlock comprising cathode resistor 86 and inductance 88.

In the absence of any applied input wave at input terminal 84 the right-hand tube of each pair, namely 81, 83, etc. will all become ionized upon each positive pulse from the circuit 33 being applied to the anodes. For this purpose the bias voltages 93,94 etc. are adjusted to the proper value to permit the tubes to ionize under these conditions. If there is an input wave at 84 corresponding to the signal S of FIG. 1, for example, and if the voltage exceeds that corresponding to the smallest step but is less than that corresponding to the next successive step, the smallest of the opposing grid voltages on the left-hand tubes, such as 91, will permit the corresponding tube 80 to ionize as soon as a positive impulse is received from circuit 33. The current flow through the inductance 88 builds up very quickly a counter-electromotive force which prevents the other tube 81 of the pair from ionizing, and the voltage drop across the resistor 86 continues to provide interlock throughout the pulse duration. If the input wave has some higher value, tube 80 in company with one or more other corresponding tubes of the other pairs breaks down during the corresponding positive pulse applied from circuit 33. The circuit 33 periodically deionizes all of the gas-filled tubes and those which reionize are determined by the input voltage conditions.

If the right-hand tube only of a pair becomes ionized the corresponding resistance 89 or 90 is connected to the impulse circuit 33 in series through a corresponding left-hand plate resistor 85 in which there is no current flowing so that the voltage applied to corresponding resistance 89 or 90 is the full voltage of the impulse circuit 33. If a left-hand tube of a pair, such as 80, is energized a smaller voltage is applied to the resistance 89 or 90 because of the IR drop in the corresponding plate resistance 85. The resistances 89, 90, etc. are high compared to the other resistances and act as potential dividers, the number of steps into which the potential is divided being the same as the number of these resistances or, what is the same thing, the number of pairs of gas-filled tubes. Since it might be difficult to obtain tubes having such voltage characteristics as to give the required voltage at the terminals of the potential dividing resistances 89, 90, etc., an opposing voltage source 95 may be used to bring the voltages in lead 96 to the desired values. Voltages appearing on lead 96, are, of course, voltages with respect to ground. For a more complete description of this stepping circuit, reference may be had to application for United States patent of M. E. Mohr, Ser. No. 407,461, filed Aug. 19, 1941, now U.S. Pat. No. 2,663,795, issued Dec. 22, 1953, in which this steping circuit is disclosed and claimed. It will be understood that the source 32 and impulse circuit 33 may be common to all of the stepping circuits at a station and that one stepping circuit 31 is used in each channel.

The frequency modulating circuit shown in FIG. 7 may be of the same type as that shown in FIG. 3 of the Riesz patent cited above. The tube 18 is a gas-filled tube having in its grid circuit a resistance 19 for coupling to the input terminals. A suitable negative bias battery is shown for the grid. The output circuit comprises a condenser 20, resistance 22 and plate battery 21. The output wave generated across resistance 22 is taken off through output transformer 25, the primary of which is connected in series with resistance 24 and blocking condenser 23. Assuming the tube is deionized. a high voltage builds up across condenser 20 sufficient to cause the tube to ionize with a given grid voltage. When the tube ionizes its resistance falls to a very low value permitting condenser 20 to discharge through the tube and reach such a low value of voltage that the discharge cannot be maintained and the tube deionizes, starting the process over again. The frequency of such a relaxation oscillator can be controlled by the magnitude of the voltage applied to the grid, the higher the positive voltage applied to the grid the higher the frequency of oscillations developed. While this circuit generates a saw-tooth wave containing many harmonics, these may be removed by suitable filters as provided in the system above described.

Figure 8:
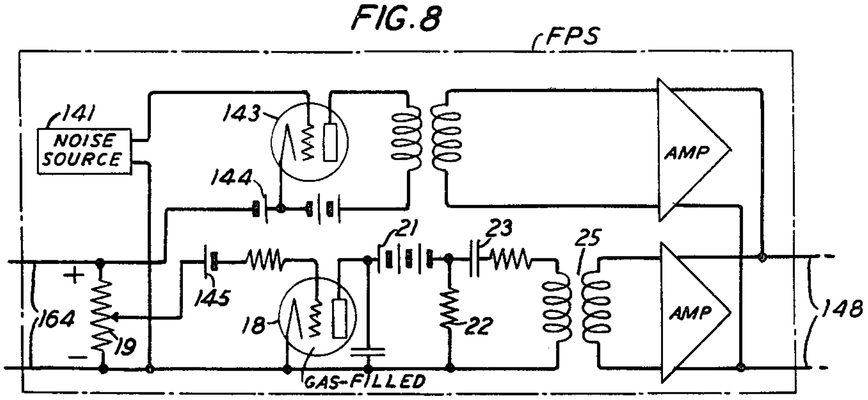
FIG. 8 is a circuit diagram of the frequency pattern source used in the receiver.

The source of frequency patterns 67 may be of the type disclosed in FIG. 8 which is the same as that shown in FIG. 3 of the Riesz patent. This comprises elements 18 to 25 as disclosed in FIG. 7 forming a relaxation oscillator for generating waves simulating vocal cord energy, the fundamental frequency of which is determined by the voltage developed across the resistance 19 for any given value of grid bias.

The continuous spectrum energy is derived from a noise source of any suitable type 141 which is applied to the input of vacuum tube 143. The outputs of both the amplifier 143 and the relaxation oscillator are combined in a common outgoing circuit 148. Amplifiers as shown may be provided if desired. Also equalizers (not shown) may be provided as disclosed in the Riesz patent if desired.

In the absence of any pitch-defining current in channel 1, no voltage is developed in resistance 19. Under these circumstances the bias from battery 145 is too great to permit generation of oscillations. Tube 143, however, is in transmitting condition and transmits the noise from source 141 to the outgoing circuit 148 leading to the synthesizing modulators. When pitch-defining currents are present in channel 1 a corresponding voltage is developed in resistance 19 in a direction to make the voltage on the grid of the gas-filled tube 18 positive and the cathode voltage of tube 43 positive with respect to its grid. This paralyzes the tube 143 and cuts off transmission of energy from the noise source. This voltage permits the relaxation oscillator to generate oscillations, the fundamental frequency of which is determined by the strength of the pitch-defining currents in channel 1.

Figure 9:
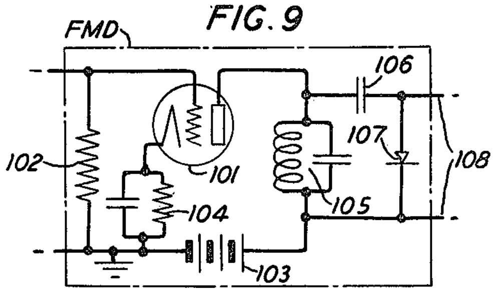
FIG. 9 is a circuit diagram of a frequency modulation detector that may be used in the system.

The frequency modulation detector disclosed in FIG. 9 comprises a vacuum tube 101 having a grid leak resistance 102 across its input terminals. The grid is self-biased from the cathode resistor 104 which is provided with the usual by-pass condenser. Between the plate and plate battery 103 is an antiresonant circuit 105 tuned to a frequency slightly higher than the highest frequency to be impressed on the grid. The voltage developed across the antiresonant circuit 105 is transmitted through blocking condenser 106 to a rectifier 107 connected across output terminals 108.

With the circuit tuned as described, the adjustment should be such that the lowest and also the highest applied frequencies lie on a relatively steep and linear portion of the resonance curve of the circuit 105. With such an adjustment, when the applied frequency has its lowest value the voltage applied to the detector 107 is a minimum and increases with increases in applied frequency. Frequency variations applied across resistance 102, therefore, result in corresponding amplitude variations across terminals 108.

The various numerical values given above in connection with the description of FIGS. 4 and 5 are not critical nor are they to be taken as limiting but they are given for illustration only. A better picture of the frequency transformations may possibly be obtained by using symbols in place of numerical values.

The relations which must be satisfied may be arrived at as follows:

Let $a$ = frequency swing assigned to represent the full amplitude change of either signal or masking code alone;

$a$ = base frequency of source 35 or 58;

$s$ = frequency deviation caused by signal in frequency modulator;

$c$ = frequency deviation caused by code in frequency modulator.

Then $a = s$ maximum $= c$ maximum.

Let $p$ and $p + a$ = two harmonics selected at transmitting end where $p$ is any convenient value for each channel;

$r$ = reference frequency of frequency modulator, i.e., the frequency when no signal or code is applied.

Then $r + s + c$ = frequency output when signal and code are present.

Modulating this with $p$ and $p + a$ gives the sum terms:

$$r + p + s + c = m + s + c$$

$$\text{and } r + p + a + s + c = m + a + s + c$$

$$\text{if } r + p = m.$$

On passing these through a band filter of width a from $m + a$ to $m + 2a$, we get out either:

$$m + s + c \text{ when } s + c > a$$

$$\text{or } m + a + s + c \text{ when } s + c > a.$$

This is the signal transmitted in the case of one low frequency channel. The reverse procedure can be traced out at the receiving end. Again we select two convenient harmonics of the base frequency, $q$ and $q + a$. The code signal (which is identical with and synchronized with the transmitting code) is then used to get a frequency $t + c$ by frequency modulation with reference to a convenient reference frequency $t$. Combining with the two harmonics in an amplitude modulator we get for the sum terms:

$$t + q + c = n + c$$

$$\text{and } t + q + a + c = n + a + c$$

if we set $t + q = n$.

The values of $t + q$ should be so selected with reference to $p$ and $r$ at the sending end that $n + a > m$.

These two frequencies are combined with the received signal in an amplitude modulator to give the difference frequencies:

$$\text{and} \quad \left.\begin{aligned} m + a + s + c - (n+c) &= m - n + a + s \\ m + a + s + c - (n+a+c) &= m - n + s \end{aligned}\right\} \text{ when } s+c < a$$

Also $$\text{and} \quad \left.\begin{aligned} m + s + c - (n+c) &= m - n + s \\ m + s + c - (n+a+c) &= m - n - a + s \end{aligned}\right\} \text{ when } s+c > a.$$

By passing these frequencies through a band-pass filter with band edges at $m - n$ and $m - n + a$ we will select the second term of the first pair and the first term of the second pair; that is, $m - n + s$. This corresponds to the original signal variation $s$ with respect to a reference frequency $m - n$ and thus the original signal amplitudes can be recovered by a frequency modulation detector. The other difference terms will fall either above or below the selecting band and will be rejected.

What is claimed is:

1. In a system of secret transmission of speech, means to subdivide speech waves constituting a message into a plurality of narrow frequency bands, means to integrate the energy in each band, means including a key for determining in successive time intervals a succession of indications unrelated to the speech being transmitted, and transmitting means controlled jointly by the integrated energy from each band and by said indications for transmitting a cipher from which to derive said speech message.

2. In a system of secret transmission of a speech message, a transmitting station and a receiving station, records containing identical recorded material, prepared in advance, at each station, means at the transmitting station to analyze the speech waves into elemental impulses, means to combine said impulses with impulses from the record at the transmitting station to produce resultant impulses in which the message is concealed, means to transmit such resultant impulses to the receiving station, and means thereat to combine said transmitted impulses with impulses from the record at the receiving station to reproduce the speech message.

3. In a system of secret transmission of speech, means to subdivide speech waves representing a message into narrow frequency bands, means to translate the energy in each band into impulses, means to introduce random variations into said impulses under control of a variable key to destroy their intelligibility, means to transmit the impulses so varied, and means to receive and retranslate said impulses to restore the message, said last means comprising means to introduce complementary variations under control of an identical key.

4. The method of secret telephony comprising analyzing a speech message wave into low frequency speech-defining waves simultaneously existent in separate circuits, adding to each speech-defining wave a key wave to produce a summation wave of a certain total range of amplitudes, deriving from each of said summation waves separate indications having one range of values for one amplitude range of the summation wave and having the same range of values for another and non-overlapping amplitude range of the summation wave.

5. The method of secret telephony comprising analyzing a speech message wave into syllabic frequency speech-defining waves simultaneously existent in separate circuits, combining with each of said speech-defining waves a key wave varying in amplitude to produce corresponding resultant waves in separate circuits, deriving from each such resultant wave an indication to be transmitted, each such indication passing through one range of values in response to one range of amplitudes of the resultant wave and passing through the same range of values in response to a different range of amplitudes of the resultant wave, and transmitting said indications simultaneously to a receiving point.

6. The method of secret telephony comprising deriving from a speech message a plurality of speech-defining waves in separate circuits having frequencies low in comparison with the speech waves from which they were derived, each such speech-defining wave varying in amplitude at the order of syllabic frequency, means for combining with each of said speech-defining waves a key wave also varying in amplitude, means to transmit indications of said combined waves simultaneously to a receiving point, and translating means for giving said indications more than two values for each combined wave and for confining the total range of variation of said values to a smaller range than the amplitude range of the combined wave in each case.

7. The method of secret transmission of speech comprising simultaneously deriving from each of a plurality of frequency regions of speech a current which varies in accordance with the variations of energy content in the corresponding frequency region of the speech, transmitting indications from which to produce a corresponding set of variable currents at a receiving point and independently determining for each such current the character of the transmitted indications jointly by the respective derived current and an individual arbitrarily varying key.

8. In a speech privacy system, means to analyze speech message waves into low frequency speech-defining signals occurring simultaneously in a plurality of channels, a record containing a corresponding plurality of recorded masking waves, means to add the respective masking waves to the speech-defining signals to mask their identity, means to transmit the resultant waves to a receiving point, a duplicate record of masking waves at the receiving point, means to combine the masking waves from the duplicate record with the received waves to cancel the masking waves from the received waves, and means to reproduce the speech message waves from the remaining speech-defining signals.

9. In a speech privacy system, the combination with a speech wave analyzer comprising band-splitting filters each followed by an integrating means for producing a low frequency wave representative of the energy present in the respective frequency band, of enciphering means for adding to each such low frequency wave an individual masking distortion before transmission, and receiving means including decipering means for canceling the distortion to enable the low frequency waves to be intelligibly received.

10. In a speech privacy system, means to analyze speech message waves into a plurality of low frequency waves simultaneously existent in a corresponding plurality of separate channels, and enciphering means for adding to each such low frequency wave a varying key wave of similar amplitude and frequency range to destroy the identity of the low frequency waves before transmission.

11. In a speech privacy system, means to subdivide speech waves on a frequency basis into a plurality of narrow bands, means to derive a low frequency wave from each narrow band representing the integrated energy in such band, means to add random distortion to each such low frequency wave before transmission to obscure their identity, means to transmit the resultant waves to a receiving point, means at the receiving point to cancel out the random distortion added before transmission, and means to reconstruct understandable speech from the remaining received low frequency waves.

12. In a speech privacy system, means to analyze speech message waves into a plurality of speech-defining waves representing syllabic rates of energy variation in each of a plurality of different frequency regions of the speech waves, each such speech-defining wave having a certain predetermined total range of variation of some significant characteristic, means to add random variations to each speech-defining wave before transmission, such addition tending to increase the total range of variation of the said characteristic, and means to confine the total range of variations of the resultant waves to said certain predetermined range comprising means effective whenever the summation of the speech-defining wave and random variations tends to exceed said certain predetermined range to reduce by a fixed amount the summation variation to cause the resultant variation to fall within said certain range, and means to transmit the speech-defining waves with their added variations to render unauthorized reception of the message difficult.

13. In a system for transmitting a speech message with privacy, means to derive from each of several different frequency regions of the speech band a low frequency index wave representing energy variations of syllabic frequency in the respective frequency region, means to add random variations to each index wave to provide privacy, and means to confine the total range of variation represented by the summation of an index wave and said random variations to a predetermined small range comprising means to cause a continuously increasing value of variation resulting from such summation to pass through the said predetermined range a plurality of times in succession.

14. A receiving system for the speech privacy system defined in claim 12 comprising means to receive said summation waves confined to said predetermined range of variation in the case of each of said index waves, means to supply at the receiver random variations identical with those added to said index waves to provide privacy, means to combine said random variations supplied at the receiver with the received summation waves to cause the added variations to be canceled leaving the index waves, and means to reconstruct the speech message from said index waves.

15. In a system for transmitting a speech message with privacy, means to derive from each of several different frequency regions of the speech band a low frequency index wave representing energy variations of syllabic frequency in the respective frequency region, means to add random variations to each index wave to provide privacy, and means to confine the total range of variation represented by the summation of an index wave and said random variations to a predetermined small range comprising means effective to transmit the direct summation of said index wave and random variation provided such summation falls within said small range, means effective to subtract a constant amount from such summation, such as to bring the difference within said small range, whenever such summation exceeds such small range, and means to transmit the wave resulting after such subtraction.

16. In a system for transmitting a speech message with privacy, means to derive from each of several different frequency regions of the speech band a low frequency index wave representing energy variations of syllabic frequency in the respective frequency region, means to add random variations to each index wave to provide privacy, a record and means cooperating therewith for supplying said random variations, means to transmit the summations of said index waves and random variations to a receiving point, a duplicate record thereat and means cooperating therewith for supplying random variations identical with those added to the index waves before transmission, means to utilize the duplicate variations at the receiving point to cancel the variations added before transmission to restore the index waves, and means to reconstruct the speech message from the restored index waves.

17. In a system for transmitting speech message waves with secrecy, means at a transmitting point to derive from each of several different frequency regions of the speech band, a low frequency index wave representing energy variations of syllabic frequency in the respective frequency region, means to translate each index wave to a frequency modulated wave, means to superpose random frequency shifts on said frequency modulated waves in accordance with a code, means to select for transmission a portion only of each resulting frequency band, said portion containing all of the frequencies necessary to reproduce the respective index wave, plus random frequency variations, and means to transmit said selected bands of waves.

18. In a system for secret transmission of speech waves, means at a transmitting point to derive from each of a plurality of regions of the speech frequency band a low frequency wave representing syllabic rate of energy variation in the respective region, the frequency of such index wave being $s$, means to translate said index waves into frequency modulated waves having frequencies varying from $r_1$ to $r_1 + s$ in the case of the first index wave, $r_2$ to $r_2 + s$ for the second index wave and so on, means to shift the frequency of each such modulated wave in accordance with a varying code, by an amount represented by $c$ where $c$ has random variations, means to shift the frequency of each such varying frequency wave to two adjacent frequency levels simultaneously, such levels being $m_1$ to $m_1 + s + c$ and $m_1 + a$ to $m_1 + a + s + c$ for the first index wave and $m_2$ to $m_2 + s + c$ and $m_2 + a$ to $m_2 + a + s + c$ for the second index wave where the maximum value of $s + c = 2a$, and means to select for transmission the band of frequencies $m_1 + a$ to $m_1 + 2a$ for the first index wave, $m_2 + a$ to $m_2 + 2a$ for the second index wave and so on.

19. The method of producing reentrant addition of two signals so that the indication for their sum never corresponds to an indication for a signal magnitude greater than the maximum of either, which comprises producing simultaneous frequency modulation of two waves of constant frequency separation by the sum of said two signals and selecting for use from the modulated waves only those waves whose frequencies fall within a fixed band whose width is the same as said constant frequency separation of said two waves.

20. The method of secret telephony comprising deriving from the speech to be sent a plurality of relatively low frequency speech-defining signals, producing a corresponding plurality of random keys, combining each of said speech-defining signals with an individual key, and rendering the combined products random in relation to the original speech-defining signals by producing simultaneous frequency modulation of two waves of constant frequency difference by said combined products and selecting for transmission only those wave components whose frequencies fall within a fixed band whose width is equal to said frequency difference.

21. The method of secret telephony comprising deriving from the speech to be sent a plurality of relatively low frequency speech-defining signals, converting said signals to stepped wave form in which the amplitude increases and decreases in equal steps, producing random keys in the form of integral multiples of a fixed amplitude equal to the amplitude change represented by one step in the case of said stepped-form signals, and using individual ones of said keys to produce reentrant masking of each of said stepped-form signals.

22. The method of secret signaling comprising adding to the signal waves a masking wave having in successive times successive magnitudes occurring in random manner to produce a summation wave of a certain total range of magnitudes in excess of the range represented by the signals alone, deriving from said summation wave indications to be transmitted, such indications having a range of magnitudes representing a fraction of said total range, and controlling the derivation of said indications to cause ascending magnitudes throughout the total range of the summation wave to produce indications passing repeatedly through said range of indications, the number of times passed through being equal to the reciprocal of said fraction.

23. In a speech privacy system, means to analyze speech message waves into a plurality of separate low frequency currents in a corresponding plurality of circuits, means connected to each such circuit for adding to the currents therein impulses varying in amplitude in random manner to mask the identity of said currents, and means to transmit indications of the summations of the respective currents and impulses to provide privacy of transmission.

24. In a speech privacy system, means to analyze speech message waves into a plurality of separate low frequency currents in a corresponding plurality of circuits, means connected to each such circuit for adding to the currents therein impulses varying in amplitude in random manner to mask the identity of said currents, means to modulate the frequencies of a corresponding plurality of high frequency waves in accordance with the summations of the respective currents and impulses, and means to transmit a portion only of the frequency bands of the resulting frequency modulated waves.

25. In a speech privacy system, means to analyze speech message waves into a plurality of separate low frequency currents in a corresponding plurality of circuits, means connected to each such circuit for adding to the currents therein impulses varying in amplitude in random manner to mask the identity of said currents, said currents and said impulses having maximum amplitudes, substantially equal, means to modulate the frequencies of a corresponding plurality of high frequency waves in accordance with the summations of the respective currents and impulses, means to modulate the amplitude of a pair of high frequency waves in accordance with each of the frequency modulated waves, said pair of high frequency waves having frequencies spaced apart by a frequency difference substantially equal to the maximum frequency swing produced by the said currents alone or by said impulses alone in said frequency modulation and a band-pass filter on the output side of each amplitude modulating means having a pass-band substantially covering the upper sideband of the wave representing the modulation of the higher of said pair of frequencies by the said current alone or by the impulses alone.

26. In a speech privacy system, a speech analyzer for reducing input speech message waves to component low frequency current waves in separate circuits, means to combine a secret key wave with each such low frequency current wave to produce summation products of such low frequency current waves and the key waves, means to reduce the total range of variation of said summation products on a reentry basis to produce resultant coded waves for transmission and multiplex transmission means for said coded waves.

27. In a privacy system, means at a transmitting point to change signal waves continuously varying in amplitude into waves varying in amplitude by abrupt steps, means to combine therewith a key wave also varying in abrupt steps in a manner unrelated to the signal, to produce a stepped summation wave, means to change said summation wave to a wave varying in steps but embracing a correspondingly smaller range of gradations between its highest and lowest steps by reentrant coding, and means to transmit such changed wave as a secret signal wave.

28. The method of secret signaling comprising at a transmitting point the steps of adding a secret key wave to a signal to produce a summation wave, and reducing the total range of variation of the summation wave by making a fixed reduction in the peak values only of said summation wave to provide a secret signal wave for transmission.

29. The method of receiving a secret signal wave transmitted according to the method of claim 28, comprising the steps of subtracting from the wave so transmitted and received a key wave identical with said secret key wave to produce a resultant signal wave in which the peak portions of the signal are displaced with respect to the rest of the signal components and restoring said displaced peaks to their normal relationship in the resultant signal wave to reproduce the signal.

30. In secret signaling, an input source of signal waves of gradually varying amplitude, a stepping circuit for converting said signal waves to waves of stepped amplitude, means providing a secret key wave of stepped amplitude, means to combine said signal and key waves to produce a summation wave of total range of variation corresponding to the sum of the ranges represented by said signal wave and key wave, means to translate said summation wave to a resultant wave of smaller range of variation including means for making a fixed reduction in the peak portions only of said summation wave, and means to transmit said resultant wave.

31. The method of secret transmission of a variable amplitude signal wave of given maximum amplitude range comprising adding thereto a variable amplitude secret key wave of comparable maximum amplitude range to produce a summation wave, translating said summation wave into a frequency modulated wave in which the frequency shift is proportional to the sum of the instantaneous amplitudes of said signal wave and said key wave and selecting for transmission as a secret signal wave a band of frequencies of total band width proportional to the maximum amplitude range of said signal.

32. The method of secret transmission of a variable amplitude signal of given maximum amplitude comprising adding thereto a variable amplitude secret key wave of comparable maximum amplitude, simultaneously modulating the frequencies of two waves differing in frequency by an amount equal to the shift of frequency corresponding to said maximum amplitude, and selecting for transmission as a secret signal wave a band of frequencies equal in width to said frequency shift, one edge of such band substantially coinciding with the unmodulated frequency of one of said two waves.

33. In a speech privacy system, means to produce and transmit a secret wave of substantially the band width of normal speech composed of juxtaposed subbands each comprising a frequency modulated wave the modulations of which are a composite of a masking current and a current representing the energy content of a frequency band representing a small fraction of the speech message wave band.

34. The method of secret transmission of a varying amplitude signal wave having a total variation between a lower amplitude limit and an upper amplitude limit comprising adding thereto a varying amplitude masking wave to produce a summation wave whose range of variation exceeds the range between said limits, producing indications proportional to the instantaneous variations of the summation wave and reducing the total range of variation of said indications by translating peaks of variation corresponding to amplitudes in excess of said upper limit into indications corresponding to amplitude variations in excess of said lower limit.

* * * * *